United States Patent
Sheridan

(10) Patent No.: US 10,066,734 B2
(45) Date of Patent: Sep. 4, 2018

(54) GEAR DRIVEN GAS TURBINE ENGINE ASSEMBLY

(71) Applicant: United Technologies Corporation, Farmington, CT (US)

(72) Inventor: William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 280 days.

(21) Appl. No.: 14/960,934

(22) Filed: Dec. 7, 2015

(65) Prior Publication Data

US 2017/0159798 A1    Jun. 8, 2017

(51) Int. Cl.

| | |
|---|---|
| F16H 57/04 | (2010.01) |
| F01D 25/18 | (2006.01) |
| F02C 7/36 | (2006.01) |
| F16H 1/28 | (2006.01) |
| F01D 25/16 | (2006.01) |

(52) U.S. Cl.
CPC ....... *F16H 57/0486* (2013.01); *F01D 25/164* (2013.01); *F01D 25/18* (2013.01); *F02C 7/36* (2013.01); *F16H 1/28* (2013.01); *F16H 57/0427* (2013.01); *F05D 2240/62* (2013.01); *F05D 2250/611* (2013.01); *F05D 2260/40311* (2013.01); *F05D 2260/602* (2013.01); *F05D 2260/98* (2013.01)

(58) Field of Classification Search
None
See application file for complete search history.

(56) References Cited

U.S. PATENT DOCUMENTS

| | | | |
|---|---|---|---|
| 2,154,532 | A | 4/1939 | Ryder |
| 5,102,379 | A | 4/1992 | Pagluica et al. |
| 5,389,048 | A | 2/1995 | Carlson |
| 5,391,125 | A | 2/1995 | Turra et al. |
| 5,433,674 | A | 7/1995 | Sheridan et al. |
| 5,466,198 | A | 11/1995 | McKibbin et al. |
| 5,472,383 | A | 12/1995 | McKibbin |
| 5,685,797 | A | 11/1997 | Barnsby et al. |
| 6,223,616 | B1 | 5/2001 | Sheridan |
| 6,964,155 | B2 | 11/2005 | McCune et al. |
| 8,191,352 | B2 | 6/2012 | Schilling |
| 8,261,527 | B1 | 9/2012 | Stearns et al. |
| 8,297,916 | B1 | 10/2012 | McCune et al. |

(Continued)

FOREIGN PATENT DOCUMENTS

WO    2015017041 A1    2/2015

OTHER PUBLICATIONS

Partial European Search Report for European Application No. 16202516.7 dated Apr. 20, 2017.

(Continued)

*Primary Examiner* — Justin Holmes
(74) *Attorney, Agent, or Firm* — Carlson, Gaskey & Olds, P.C.

(57) ABSTRACT

A gas turbine engine includes a planetary gear system including a sun gear, intermediate gears, and a ring gear. A lubricant recovery system for the planetary gear system includes fluid passages that extend through the planetary gear system. A gutter is located radially outward from the planetary gear system for collecting lubricant. At least a portion of the gutter is rigidly attached to the ring gear.

20 Claims, 3 Drawing Sheets

(56) References Cited

U.S. PATENT DOCUMENTS

| | | | |
|---|---|---|---|
| 8,484,942 B1 | 7/2013 | McCune et al. | |
| 8,517,670 B1 | 8/2013 | Coffin et al. | |
| 8,708,863 B2 * | 4/2014 | McCune | F01D 5/027 |
| | | | 475/159 |
| 8,807,916 B2 * | 8/2014 | Sheridan | F02C 7/36 |
| | | | 415/1 |
| 8,813,469 B2 | 8/2014 | Sheridan | |
| 8,894,538 B2 * | 11/2014 | McCune | F01D 5/027 |
| | | | 475/331 |
| 2010/0317478 A1 * | 12/2010 | McCune | F01D 25/166 |
| | | | 475/159 |
| 2011/0206498 A1 | 8/2011 | McCooey | |
| 2012/0088624 A1 * | 4/2012 | Sheridan | F01D 25/16 |
| | | | 475/159 |
| 2013/0186058 A1 | 7/2013 | Sheridan et al. | |
| 2015/0300255 A1 | 10/2015 | Gallet | |

OTHER PUBLICATIONS

Jane's Aero-Engines, Edited by Bill Gunstron, Issue Seven, Mar. 2000. pp. 510-512.
Performance and Weight Estimates for an Advanced Open Rotor Engine, Eric S. Hendricks and Michael T. Tong, NASA/TM-2012-217710, AIAA-2012-3911, Sep. 2012, pp. 1-13.
Ciepluch et al., "Quiet, Powered-Lift Propulsion," NASA Conference Publication 2077, Nov. 14-15, 1978 (429 pages).
Civil Turbojet/Turbofan Specifications. Website: http://www.jet-engine.net/civtfspec.html.
European Search Report for European Application No. 16202516.7 dated Sep. 1, 2017.

* cited by examiner

GEAR DRIVEN GAS TURBINE ENGINE ASSEMBLY

BACKGROUND

A gas turbine engine typically includes a fan section, a compressor section, a combustor section and a turbine section. Air entering the compressor section is typically compressed and delivered into the combustion section where it is mixed with fuel and ignited to generate a high-speed exhaust gas flow. The high-speed exhaust gas flow typically expands through the turbine section to drive the compressor and the fan section.

A speed reduction device, such as an epicyclical gear assembly, may be utilized to drive the fan section such that the fan section rotates at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The fan section includes a plurality of fan blades mounted to a hub supported by bearings for rotation about the engine axis. The hub is coupled to an output of the geared architecture. The bearings require lubricant that is supplied through lubricant passages. The geared architecture also requires lubricant. The structures required for communicating lubricant to the bearings and geared architecture can complicate assembly and require additional space.

Although geared architectures have improved propulsive efficiency, turbine engine manufacturers continue to seek further improvements to engine performance including improvements to thermal, transfer and propulsive efficiencies.

SUMMARY

In one exemplary embodiment, a gas turbine engine includes a planetary gear system including a sun gear, intermediate gears, and a ring gear. A lubricant recovery system for the planetary gear system includes fluid passages that extend through the planetary gear system. A gutter is located radially outward from the planetary gear system for collecting lubricant. At least a portion of the gutter is rigidly attached to the ring gear.

In a further embodiment of any of the above, the ring gear includes a radially extending flange and at least a portion of the gutter is in direct contact with the radially extending flange on the ring gear.

In a further embodiment of any of the above, the gutter includes a forward portion and an aft portion. The forward portion of the gutter is located axially forward of the radially extending flange relative to an engine axis of the gas turbine engine. The aft portion is located axially aft of the radially extending flange relative to the engine axis.

In a further embodiment of any of the above, the ring gear is attached to a static structure with a ring gear flexible coupling and the aft portion of the gutter is integral with the ring gear flexible coupling.

In a further embodiment of any of the above, a ring gear flexible coupling connects the ring gear to an engine static structure. A sun gear flexible coupling connects the sun gear to a drive shaft.

In a further embodiment of any of the above, the ring gear flexible coupling and the sun gear flexible coupling define a lateral and transverse stiffness. A stop on the engine static structure limits movement of the planetary gear system.

In a further embodiment of any of the above, at least one of the intermediate gears is supported by a journal bearing that includes a pin that has a circumferentially extending slot in opposing axial ends for allowing the journal bearing to flex.

In a further embodiment of any of the above, there is a bypass ratio of greater than ten (10).

In another exemplary embodiment, a gas turbine engine includes a planetary gear system that includes a sun gear, intermediate gears, and a ring gear. A ring gear flexible coupling connects the ring gear to an engine static structure. A sun gear flexible coupling connects the sun gear to a drive shaft. The gas turbine engine includes a bypass ratio of greater than 10.

In a further embodiment of any of the above, there is a lubricant recovery system for the planetary gear system which includes fluid passages that extend through the planetary gear system. A gutter is located radially outward from the planetary gear system for collecting lubricant. At least a portion of the gutter is rigidly attached to the ring gear.

In a further embodiment of any of the above, the ring gear includes a radially extending flange. At least a portion of the gutter is in direct contact with the radially extending flange on the ring gear.

In a further embodiment of any of the above, the gutter includes a forward portion and an aft portion. The forward portion of the gutter is located axially forward of the radially extending flange relative to an engine axis of the gas turbine engine. The aft portion is located axially aft of the radially extending flange relative to the engine axis.

In a further embodiment of any of the above, the ring gear flexible coupling and the sun gear flexible coupling define a lateral and transverse stiffness. A stop on the engine static structure limits movement of the planetary gear system.

In a further embodiment of any of the above, at least one of the intermediate gears is supported by a journal bearing and includes a pin that has a circumferentially extending slot in opposing axial ends for allowing the journal bearing to flex.

In another exemplary embodiment, a gas turbine engine includes a planetary gear system including a sun gear, intermediate gears, and a ring gear. A journal bearing supports an intermediate gear and includes a pin that extends between opposite sides of a carrier. The pin has a circumferentially extending slot formed in opposing axial ends for allowing the journal bearing to flex under load. The gas turbine engine includes a bypass ratio of greater than 10.

In a further embodiment of any of the above, a lubricant recovery system for the planetary gear system include fluid passages that extend through the planetary gear system. A gutter is located radially outward from the planetary gear system for collecting lubricant. At least a portion of the gutter is rigidly attached to the ring gear.

In a further embodiment of any of the above, the ring gear includes a radially extending flange. At least a portion of the gutter is in direct contact with the radially extending flange on the ring gear.

In a further embodiment of any of the above, the gutter includes a forward portion and an aft portion. The forward portion of the gutter is located axially forward of the radially extending flange relative to an engine axis of the gas turbine engine. The aft portion is located axially aft of the radially extending flange relative to the engine axis.

In a further embodiment of any of the above, a ring gear flexible coupling connects the ring gear to an engine static structure. A sun gear flexible coupling connects the sun gear to a drive shaft.

In a further embodiment of any of the above, the ring gear flexible coupling and the sun gear flexible coupling define a lateral and transverse stiffness. A stop on the engine static structure limits movement of the planetary gear system.

DETAILED DESCRIPTION

Figure 1:
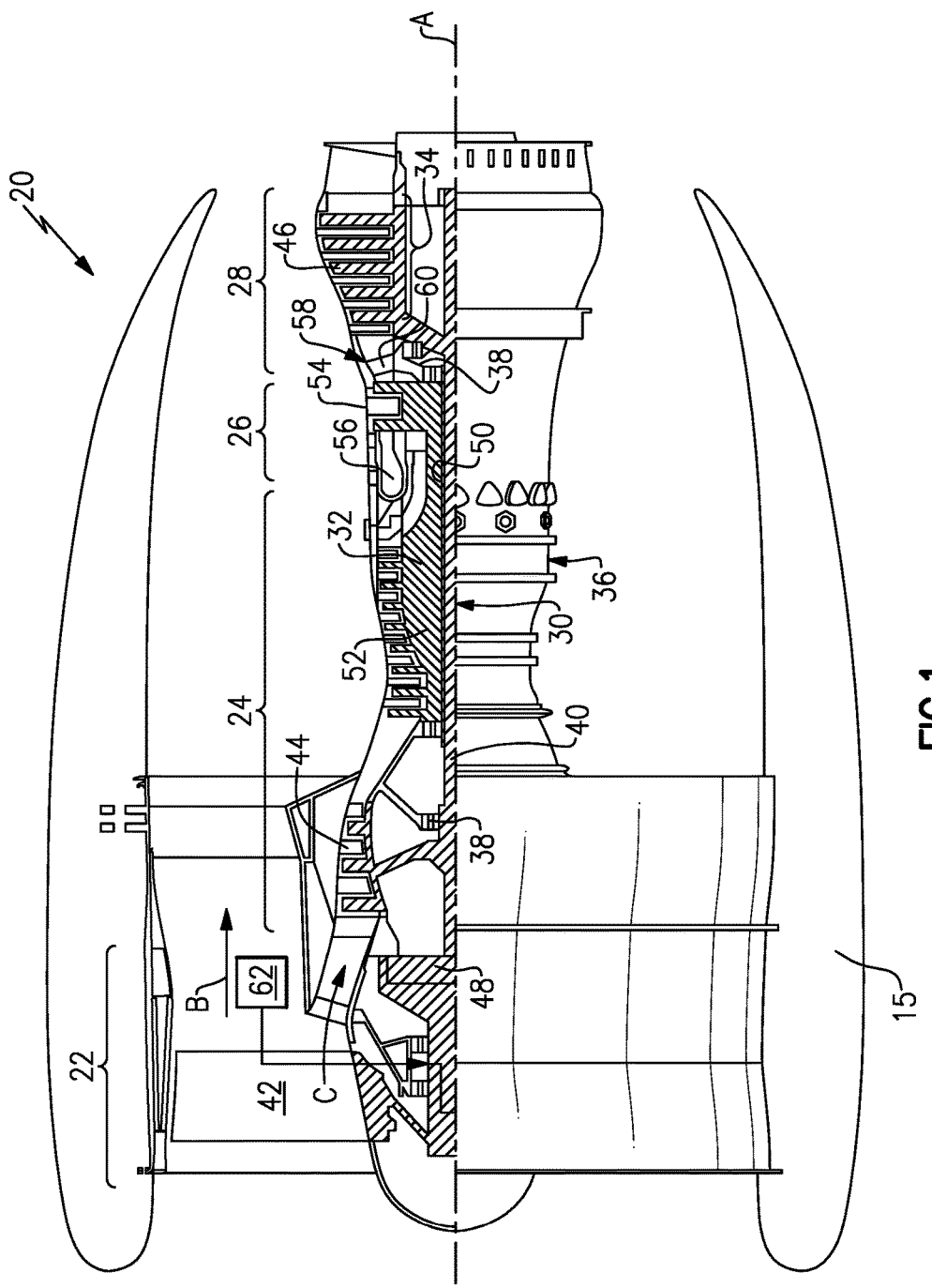
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15 while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow through the core flow path C is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. In one example, the engine bypass ratio is determined at the TSFC conditions. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
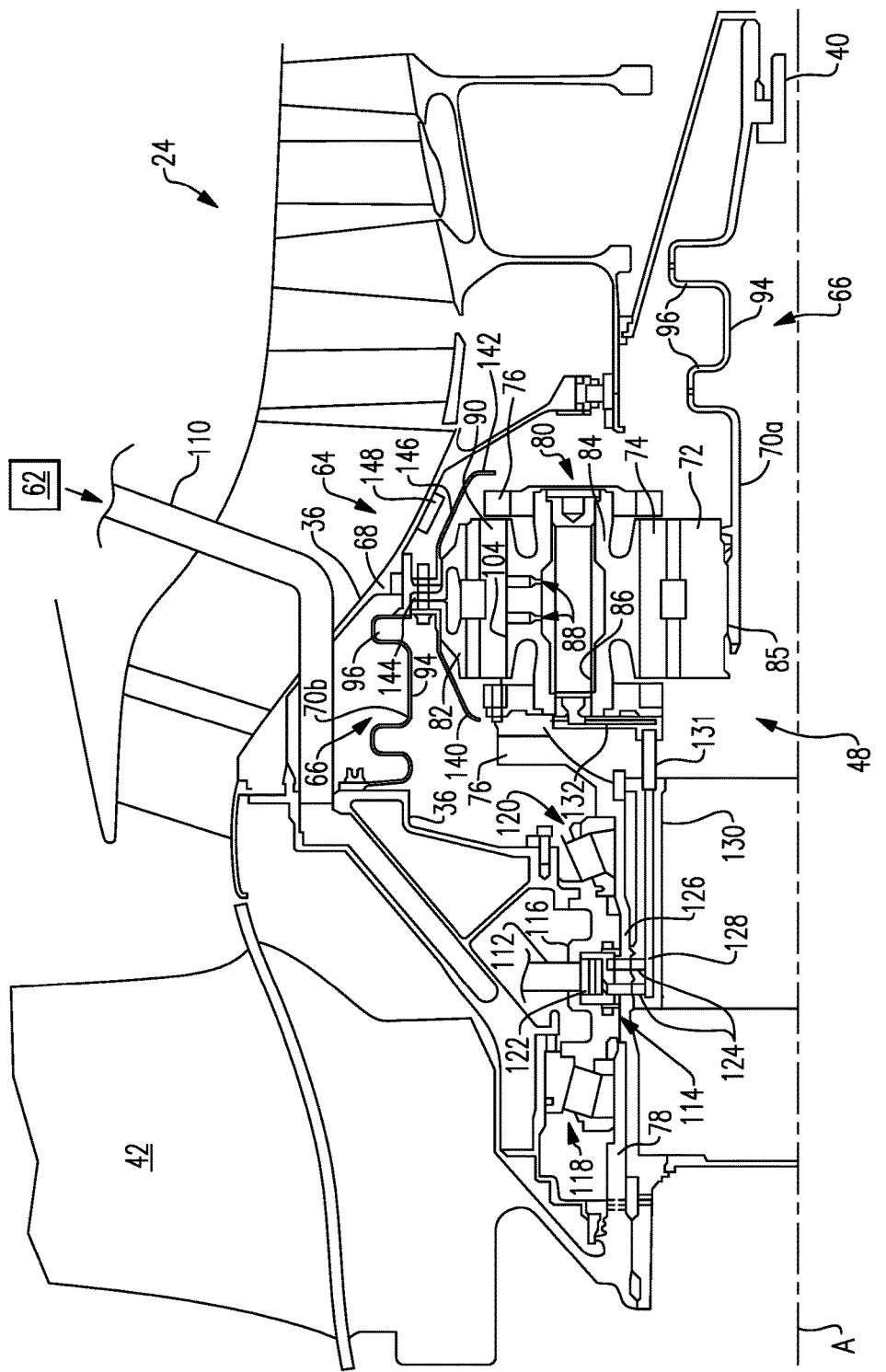
FIG. 2 is an enlarged view of a portion of the gas turbine engine shown in FIG. 1.

As shown in FIG. 2, the gas turbine engine 20 includes a lubrication system 62 that supplies lubricant to the geared architecture 48, a lubrication recovery system 64 to recover lubricant from the lubrication system 62, and a support assembly 66 for supporting the geared architecture 48.

The geared architecture 48 is located intermediate the fan 42 and the compressor section 24. The geared architecture 48 is driven by a drive shaft flexible coupling 70a attached to the inner shaft 40 which is driven by the low pressure turbine 46. The drive shaft flexible coupling 70a engages a sun gear 72 located radially inward from a plurality of intermediate gears 74 that are in engagement with the sun gear 72. A forward end of the drive shaft flexible coupling 70a is joined to the sun gear 72 by a spline 85 to transfer rotatory motion from the inner shaft 40 to the sun gear 72.

The intermediate gears 74 are supported by a carrier 76 that is attached to a fan drive shaft 78 through a torque shaft to rotate the fan 42. Each of the intermediate gears 74 are supported by journal bearing assemblies 80. The journal bearing assemblies 80 extend between and are mounted to opposite axial sides of the carrier 76. A ring gear 82 is located radially outward of the intermediate gears 74. The ring gear 82 engages the intermediate gears 74 on a radially inner side and is fixed to the engine static structure 36 on a radially outer side. In one embodiment, the sun gear 72, the intermediate gears 74, and the ring gear 82 are herringbone gears.

The ring gear 82 is attached to the engine static structure 36 with a ring gear flexible coupling 70b. The ring gear flexible couplings 70a, 70b allow movement of the ring gear 82 until the geared architecture 48 contacts a stop 68 on the engine static structure 36.

The flexible couplings 70a, 70b each include a rigid spindle 94 and at least one flexible section 96 that forms an undulation. In the illustrated embodiment, each of the flexible couplings 70a, 70b include two flexible sections 96. The flexible sections 96 extend radially outward from the rigid spindle 94 to form a ring with a diameter larger than a diameter of the rigid spindle 94. The drive shaft flexible coupling 70a accommodates misalignment between the sun gear 72 and the inner shaft 40 and the ring gear flexible coupling 70b accommodates misalignment between the ring gear 82 and the engine static structure 36. In this disclosure, axial or axially or radial or radially is in relation to the axis A of the gas turbine engine 20 unless stated otherwise.

Figure 3:
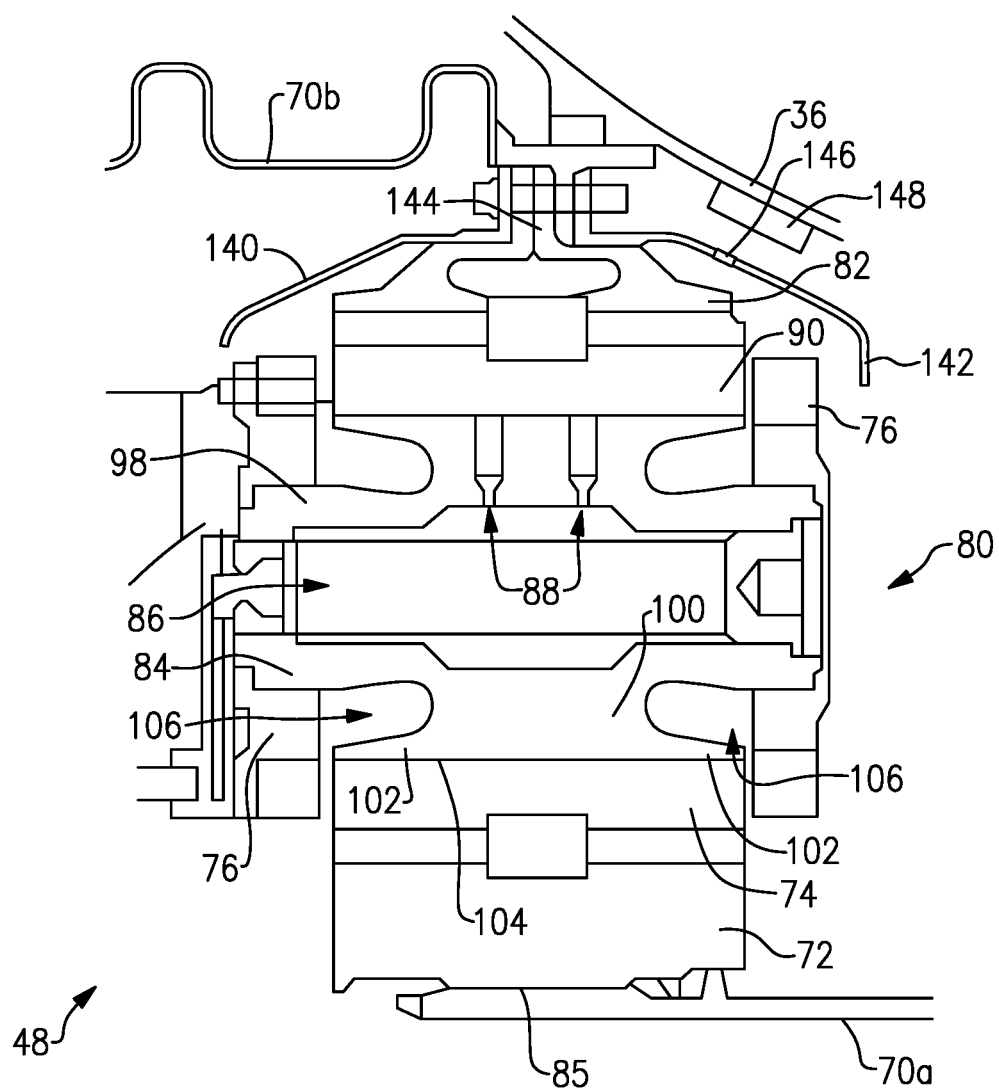
FIG. 3 is another enlarged view of a portion of the gas turbine engine shown in FIG. 1.

FIG. 3 illustrates an enlarged view of a portion of the geared architecture 48 showing the intermediate gear 74 supported on the journal bearing assembly 80. The journal bearing assembly 80 includes a pin 84 that extends through the intermediate gear 74 and is supported on opposing ends by the carrier 76. The pin 84 includes an axially extending internal passages 86 and at least one radially extending internal passage 88. The internal passages 86, 88 supply lubricant from the lubrication system 62 to an interface between the pin 84 and a gear portion 90 of the intermediate gear 74. The pin 84 includes a cylindrical portion 98 that extends axially between the opposing faces of the carrier 76 at least partially defining the axially extending internal passage 86. A radially extending portion 100 extends radially outward from a central axial portion of the cylindrical portion 98. A pair of winged portions 102 extend in opposing axial directions from the radially extending portion 100 and define circumferentially extending slots 106 between the winged portions 102 and the cylindrical portion 98. A radially outer surface of the radially extending portion 100 and the pair of winged portions 102 form the bearing surface 104 facing the gear portion 90 of the intermediate gear 74.

The combination of the pin 84 and the carrier 76 function to maintain the bearing surface 104 as linear as possible to reduce variation in contact between the bearing surface 104 and the gear portion 90 of the intermediate gear 74. Because the winged portions 102 include a reduced thickness adjacent the slot 106, the winged portions 102 are able to deflect radially inward in response to loading in the radially inward direction on the bearing surface 104.

The lubrication system 62 provides lubricant to the bearing surface 104 through a series of passage. As shown in FIG. 2, the lubrication system 62 provides lubricant to a lubricant inlet tube 110. From the lubricant inlet tube 110, lubricant travels into a feeder tube 112 to a transfer bearing assembly 114. The feeder tube 112 extends through a spring spacer 116 that defines a spacing between a first bearing assembly 118 and the second bearing assembly 120 and provides a preload on the bearings assemblies 118, 120.

The feeder tube 112 includes a seal head portion 122 that fits within the transfer bearing assembly 114. The transfer bearing assembly 114 includes openings that correspond with passages 124 through the torque shaft 126. The passages 124 communicate lubricant supplied from the lubrication system 62 through the feeder tube 112 to an intermediate lubricant passage 128. As appreciated, in this example, a single lubricant passage 128 is shown. However, a plurality of lubricant passages 128 may be utilized to communicate lubricant to different parts of the geared architecture 48.

In this example, a lubricant manifold 130 is attached to the torque shaft 126 and rotates with the torque shaft 126 about the axis A. Lubricant provided through the feeder tube 112 passes through passages 124 within the torque shaft 126 to the intermediate lubricant passage 128. From the intermediate lubricant passage 128, lubricant is passed through a conduit 131 to passages 132 defined within the carrier 76. The passages 132 direct the lubricant into the axially extending internal passage 86 in the journal bearing assembly 80.

Once the lubricant enters the axially extending internal passage 86, the lubricant will then be directed toward the radially extending passages 88. The radially extending passages 88 direct the lubricant to the bearing surface 104 to provide lubricant between the pin 84 and the gear portion 90 of the intermediate gear 74. The lubricant can then travel radially outward from the pin 84 to lubricate the interface between the intermediate gear 74 and the ring gear 82. The lubricant is then recovered with the lubrication recovery system 64. In one embodiment, the intermediate gears and the ring gear 82 include radially extending fluid passages to aid in transferring the lubricant through the geared architecture 48.

Once the lubricant passes radially outward of the ring gear 82, the lubricant collects on a forward gutter portion 140 and an aft gutter portion 142. The gutter portions 140, 142 are located radially outward from the ring gear 82 and are axially aligned with the geared architecture 48. In the illustrated embodiment, the gutter portions 140, 142 are U-shaped. The forward gutter portion 140 attaches directly to a radially extending flange 144 on the ring gear 82 on an axially forward side of the flange 144. The aft gutter portion 142 attaches to an axially downstream side of the flange 144. In the illustrated embodiment, the ring gear flexible coupling 70b attaches directly to the downstream side of the flange 144 and the aft gutter portion 142 directly contacts the ring gear flexible coupling 70b. In another embodiment, the aft gutter portion 142 and the flexible coupling 70b could be formed as single piece without a discontinuity separating the ring gear flexible coupling 70b from the aft gutter portion 142.

A gutter sump passage 146 is located in at least one of the gutter portions 140, 142 to allow the lubricant to travel radially outward through the gutter portions 140, 142. In the illustrated embodiment, the gutter sump passage 146 is located in the aft gutter portion 142. However, the gutter sump passage 146 could be located on the forward gutter portion 140. The gutter sump passage 146 directs the lubricant to a sump 148 to allow the lubricant to be reused in the gas turbine engine 20.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a planetary gear system including a sun gear, intermediate gears, and a ring gear;
   a torque shaft driven by the planetary gear system including a lubricant manifold located radially inward from the torque shaft wherein the torque shaft is supported by a first bearing and a second bearing;
   an oil transfer bearing in fluid communication with the lubricant manifold and located axially between the first bearing and the second bearing; and
   a lubricant recovery system for the planetary gear system comprising:
      fluid passages extending through the planetary gear system; and
      a gutter located radially outward from the planetary gear system for collecting lubricant, at least a portion of the gutter is rigidly attached to the ring gear.

2. The gas turbine engine of claim 1, wherein the ring gear includes a radially extending flange and at least a portion of the gutter is in direct contact with the radially extending flange on the ring gear.

3. The gas turbine engine of claim 1, wherein the gutter includes a forward portion and an aft portion, the forward portion of the gutter is located axially forward of the radially extending flange relative to an engine axis of the gas turbine engine and the aft portion is located axially aft of the radially extending flange relative to the engine axis.

4. The gas turbine engine of claim 3, wherein the ring gear is attached to a static structure with a ring gear flexible coupling and the aft portion of the gutter is integral with the ring gear flexible coupling.

5. The gas turbine engine of claim 4, wherein a portion of the ring gear flexible coupling is at least partially radially aligned with a radially extending flange on the ring gear.

6. The gas turbine engine of claim 1, including a ring gear flexible coupling connecting the ring gear to an engine static structure and a sun gear flexible coupling connecting the sun gear to a drive shaft, wherein the ring gear flexible coupling and the sun gear flexible coupling define a lateral and transverse stiffness and a stop on the engine static structure limits movement of the planetary gear system.

7. The gas turbine engine of claim 1, wherein at least one of the intermediate gears is supported by a journal bearing including a pin having a circumferentially extending slot in opposing axial ends for allowing the journal bearing to flex.

8. The gas turbine engine of claim 1, including a bypass ratio of greater than ten (10).

9. A gas turbine engine comprising:
   a planetary gear system including a sun gear, intermediate gears, and a ring gear;
   a ring gear flexible coupling connecting the ring gear to an engine static structure; and
   a sun gear flexible coupling connecting the sun gear to a drive shaft, wherein the gas turbine engine includes a bypass ratio of greater than 10;
   a torque shaft driven by the planetary gear system including a lubricant manifold located radially inward from the torque shaft wherein the torque shaft is supported by a first bearing and a second bearing;
   an oil transfer bearing in fluid communication with the lubricant manifold and located axially upstream from the planetary gear system, wherein a conduit connects the lubricant manifold and a carrier supporting the planetary gear system; and
   a lubricant recovery system for the planetary gear system comprising:
      fluid passages extending through the planetary gear system; and
      a gutter located radially outward from the planetary gear system for collecting lubricant, at least a portion of the gutter is rigidly attached to the ring gear.

10. The gas turbine engine of claim 9, wherein the ring gear includes a radially extending flange and at least a portion of the gutter is in direct contact with the radially extending flange on the ring gear.

11. The gas turbine engine of claim 10, wherein the gutter includes a forward portion and an aft portion, the forward portion of the gutter is located axially forward of the radially extending flange relative to an engine axis of the gas turbine engine and the aft portion is located axially aft of the radially extending flange relative to the engine axis.

12. The gas turbine engine of claim 9, wherein the ring gear flexible coupling and the sun gear flexible coupling define a lateral and transverse stiffness and a stop on the engine static structure limits movement of the planetary gear system.

13. The gas turbine engine of claim 12, wherein a portion of the ring gear flexible coupling is at least partially radially aligned with a radially extending flange on the ring gear.

14. The gas turbine engine of claim 10, wherein at least one of the intermediate gears is supported by a journal bearing including a pin having a circumferentially extending slot in opposing axial ends for allowing the journal bearing to flex.

15. A gas turbine engine comprising:
   a planetary gear system including a sun gear, intermediate gears, and a ring gear; and
   a torque shaft driven by the planetary gear system including a lubricant manifold located radially inward from the torque shaft;
   an oil transfer bearing in fluid communication with the lubricant manifold and located axially upstream from the planetary gear system, wherein a conduit fluidly connects the lubricant manifold and with a carrier lubricant passage in a carrier supporting the planetary gear system; and
   a journal bearing supporting an intermediate gear, including a pin extending between opposite sides of a carrier, the pin having a circumferentially extending slot formed in opposing axial ends for allowing the journal bearing to flex under load, wherein the journal bearing is in fluid communication with the carrier lubricant passage and the gas turbine engine includes a bypass ratio of greater than 10.

16. The gas turbine engine of claim 15, including a lubricant recovery system for the planetary gear system comprising:
   fluid passages extending through the planetary gear system;
   a gutter located radially outward from the planetary gear system for collecting lubricant, at least a portion of the gutter is rigidly attached to the ring gear.

17. The gas turbine engine of claim 16, wherein the ring gear includes a radially extending flange and at least a portion of the gutter is in direct contact with the radially extending flange on the ring gear.

18. The gas turbine engine of claim 17, wherein the gutter includes a forward portion and an aft portion, the forward portion of the gutter is located axially forward of the radially extending flange relative to an engine axis of the gas turbine engine and the aft portion is located axially aft of the radially extending flange relative to the engine axis.

19. The gas turbine engine of claim 15, including a ring gear flexible coupling connecting the ring gear to an engine static structure and a sun gear flexible coupling connecting the sun gear to a drive shaft.

20. The gas turbine engine of claim 19, wherein the ring gear flexible coupling and the sun gear flexible coupling define a lateral and transverse stiffness and a stop on the engine static structure limits movement of the planetary gear system.

* * * * *